US007992799B2

(12) United States Patent
Wernli et al.

(10) Patent No.: US 7,992,799 B2
(45) Date of Patent: Aug. 9, 2011

(54) DEVICE AND METHOD FOR THE MANAGEMENT OF DATA

(75) Inventors: Heinz Wernli, Veltheim (CH); Andreas Kilchenmann, Niederlenz (CH); Urs Rüedi, Wohlen (CH)

(73) Assignee: Sulzer Metco AG, Wohlen (CH)

( * ) Notice: Subject to any disclaimer, the term of this patent is extended or adjusted under 35 U.S.C. 154(b) by 351 days.

(21) Appl. No.: 12/075,405

(22) Filed: Mar. 11, 2008

(65) Prior Publication Data

US 2008/0223952 A1 Sep. 18, 2008

(30) Foreign Application Priority Data

Mar. 16, 2007 (EP) .................................... 07104364

(51) Int. Cl.
*B05C 5/04* (2006.01)
*B23K 9/00* (2006.01)

(52) U.S. Cl. ........... 239/79; 239/1; 239/69; 219/121.48; 219/121.54

(58) Field of Classification Search ................ 239/1, 69, 239/71, 79, 81–85, 135; 219/121.36, 121.48, 219/121.54, 121.59
See application file for complete search history.

(56) References Cited

U.S. PATENT DOCUMENTS 5,357,076 A * 10/1994 Blankenship ............ 219/121.54
6,008,464 A * 12/1999 Donnart et al. .......... 219/121.54
6,072,146 A * 6/2000 Matuschek et al. ........... 219/110
6,855,914 B1 * 2/2005 Kaufman et al. ........ 219/137.71
2004/0245354 A1 * 12/2004 Srinivasan ...................... 239/74
2005/0061784 A1 * 3/2005 Matus ...................... 219/121.54
2005/0063131 A1 3/2005 Perkins
2005/0103767 A1 * 5/2005 Kainec et al. ............. 219/130.5
2006/0213892 A1 * 9/2006 Ott ............................... 219/132

FOREIGN PATENT DOCUMENTS

DE 197 56 445 A1 2/1999
EP 0 508 482 A2 10/1992
EP 1 084 757 A2 3/2001
EP 1 516 688 A1 3/2005
WO WO 03/086654 A1 10/2003

* cited by examiner

*Primary Examiner* — Darren W Gorman
(74) *Attorney, Agent, or Firm* — Kilpatrick Townsend & Stockton LLP

(57) ABSTRACT

A system for the data management of a thermal spraying apparatus with a spray gun (2) is made available, wherein the system includes a decentrally arranged device (1) with a memory (4), in order to detect process parameters and to store data of the thermal spraying apparatus and wherein the data contain identification and operating data of the thermal spraying apparatus and the device (1) additionally includes a bus interface (6) for the transmitting of the data.

12 Claims, 3 Drawing Sheets

DEVICE AND METHOD FOR THE MANAGEMENT OF DATA

CROSS-REFERENCES TO RELATED APPLICATIONS

This application claims the priority of European Application No. 07104364.0, filed on Mar. 16, 2007, the disclosure of which is incorporated herein by reference.

BACKGROUND OF THE INVENTION

The invention relates to a system for the data management of a thermal spraying apparatus, in particular of a thermal spraying apparatus with a spray gun, and a method for the data management of a thermal spraying apparatus, in particular of a thermal spraying apparatus with a spray gun.

Thermal coating apparatuses such as thermal spraying apparatuses are used nowadays in many industrial manufacturing areas in order to coat substrates. Typical substrates include for example workpieces with curved surfaces such as the cylinder running surfaces of combustion engines, a plurality of semi-finished goods such as components on which a corrosion protection is applied by means of the thermal spraying before the further surface treatment, but also essentially planar substrates such as wafers and foils onto which a coating is sprayed or applied by vapor deposition. A plurality of further applications is additionally known to the person averagely skilled in the art. For example, apparatuses for plasma spraying, high velocity flame spraying (HVOF), flame spraying and arc spraying belong to the familiar thermal spraying apparatuses. The thermal spraying apparatuses have in common the fact that they each include a separate spraying device with a torch, which will be referred to in the following as a spray gun. In English, the spray gun is mainly termed a gun. The term spray gun primarily refers to the function and not to the actual shape, which can differ from the shape of a gun or pistol.

Process parameter monitoring in conventional thermal spraying devices is restricted, if monitoring of this kind is provided at all, to a few factors such as, for example, electrical current, the electrical voltage or the electrical power in plasma guns and arc spraying guns or the pressure of a gas supply, which are respectively detected at the corresponding power or gas supply. Furthermore, there are designs in which measuring lines are present for the measurement of the electrical voltage at the gun, with the conversion and evaluation of the voltage taking place in a different part of the thermal spraying apparatus at a safe distance from the spray gun.

A plasma spraying apparatus is described in the document EP-A-1 635 623 in which an operating state is monitored by means of a pressure sensor. The described plasma spraying apparatus includes a plasma spray gun to which spray powder is supplied during spraying by means of a transport gas. The pressure sensor is arranged in a transport gas line or in the line which is used for the supply of the spray powder and serves to detect faulty operating conditions, such as blockages in the spray powder supply for example.

A more advanced process monitoring has not been provided in prior art thermal spraying apparatuses. Thus, for example, a monitoring by which the detection and storing of process parameters and/or of operating conditions at and/or in the spray gun is effected has not previously taken place. Due to the gun necessary for thermal spraying, the environmental conditions at or in the spray gun seem poorly suited to the use of electronic circuits for the detection and storing of process parameters and operating conditions. Thus, depending on the type of torch used in the spray guns, high voltages, high currents and/or high fields could arise. Additionally the temperatures produced by the guns and the remaining environmental conditions in the industrial use of the spray guns pose a potential danger for electronic components. Furthermore, current spray guns for thermal spraying apparatuses are built as compactly as possible, so that there is little space available in them for a detection and storing of process parameters.

SUMMARY OF THE INVENTION

It is an object of the present invention to make available a system and a method for the data management of a thermal spraying apparatus, in particular of a thermal spraying apparatus with a spray gun, which makes possible an identification and monitoring of the thermal spraying apparatus and/or of one or more components of the same.

The system according to the invention for the data management of a thermal spraying apparatus, in particular of a thermal spraying apparatus with a spray gun, includes at least one decentrally arranged device each having a memory in order to store data of the thermal spraying apparatus and/or from one or more components of the same, wherein the data contains identification data and operating data of the thermal spraying apparatus and of the components respectively, and the device additionally includes a bus interface for transmitting data, for example for transmitting data to an evaluation unit. Among the components from which data is decentrally detected include, for example, the spray gun and/or a container for spray powder, which can be provided with a decentralized and/or local device for the storage of the data of the spray powder which has been poured in. The stored data of the spray powder can include data such as for example type and/or production batch and/or temperature and/or moisture. In an advantageous variant, the device can be supplied with power via the bus interface. In another advantageous variant the bus interface includes one or more data lines, and in a further advantageous embodiment the memory is formed as a non-volatile memory, for example as an electrically erasable programmable read-only memory (EEPROM).

If required the system can additionally include at least one pick-up connected to the device, in order to detect process parameters and/or operating conditions at the thermal spraying apparatus or at the components, for example a measuring sensor for an electrical voltage and/or a temperature and/or a pressure and/or a through flow and/or the presence of a flame.

In a further advantageous embodiment the device is surrounded by a housing or a housing part, which can be mounted in and/or at, in particular directly on, the thermal spraying apparatus or at one of the components such as the spray gun for example, so that the mounted device remains permanently connected to the thermal spraying apparatus or the component even during a change of the place of use.

The method according to the invention for the data management of a thermal spraying apparatus, in particular of a thermal spraying apparatus with one or more components such as for example a spray gun, is characterized in that data of the thermal spraying apparatus and/or from one or more components of the same is made available and stored in a memory of a decentrally arranged device, in that the data contains identification and operating data of the thermal spraying apparatus and in that the data is transmitted via a bus interface of the device, for example to an evaluation unit. In an advantageous embodiment of the method the power supply of the device takes place via the bus interface.

In a further advantageous embodiment, process parameters and/or operating conditions are detected by means of at least one pick-up at the thermal spraying apparatus and/or at one or more of the components and are conveyed to the device and stored there in the memory. In this connection, for example, an electrical voltage and/or a temperature and/or a pressure and/or a through flow and/or the presence of a flame at the thermal spraying apparatus or at the spray gun can be detected.

In a further advantageous embodiment, the thermal spraying apparatus includes a spray gun with a torch, for example a torch for plasma spraying or a torch for HVOF spraying or a torch for flame spraying or a torch for arc spraying.

The invention further includes a thermal spraying apparatus including a spray gun and a system in accordance with one or more of the above-described embodiments, wherein the spray gun can contain a torch, for example a torch for a plasma spraying gun or a torch for HVOF spraying or a torch for flame spraying or a torch for arc spraying.

The system and method in accordance with the present invention have the advantage that identification data of the spray gun, operating data such as the operating time of the spray gun or of parts of the same or process parameters, can be stored in or at the spray gun. Due to the stored identification data each spray gun can be automatically identified independently of the place of use, thus simplifying not only the exchange of the spray guns but also the quality assurance. The operating duration stored in or at the spray gun can, for example, be used to display impending servicing, in order to service or exchange parts subject to wear such as nozzles or electrodes. Due to the bus interface which is provided in the system and method, the stored data can also be transmitted over longer line lengths of 10 m and more. Furthermore, the storing of process parameters together with their detection in or at the spray gun makes possible a better monitoring of the thermal spraying procedure compared with the prior art.

The above description of embodiments and variants merely serves as an example. Furthermore, within the scope of the present invention individual features from the described or shown embodiments and variants can be combined with one another in order to form new embodiments.

The invention will be described more closely in the following with reference to the embodiments and with reference to the drawing.

DESCRIPTION OF THE PREFERRED EMBODIMENTS

Figure 1:
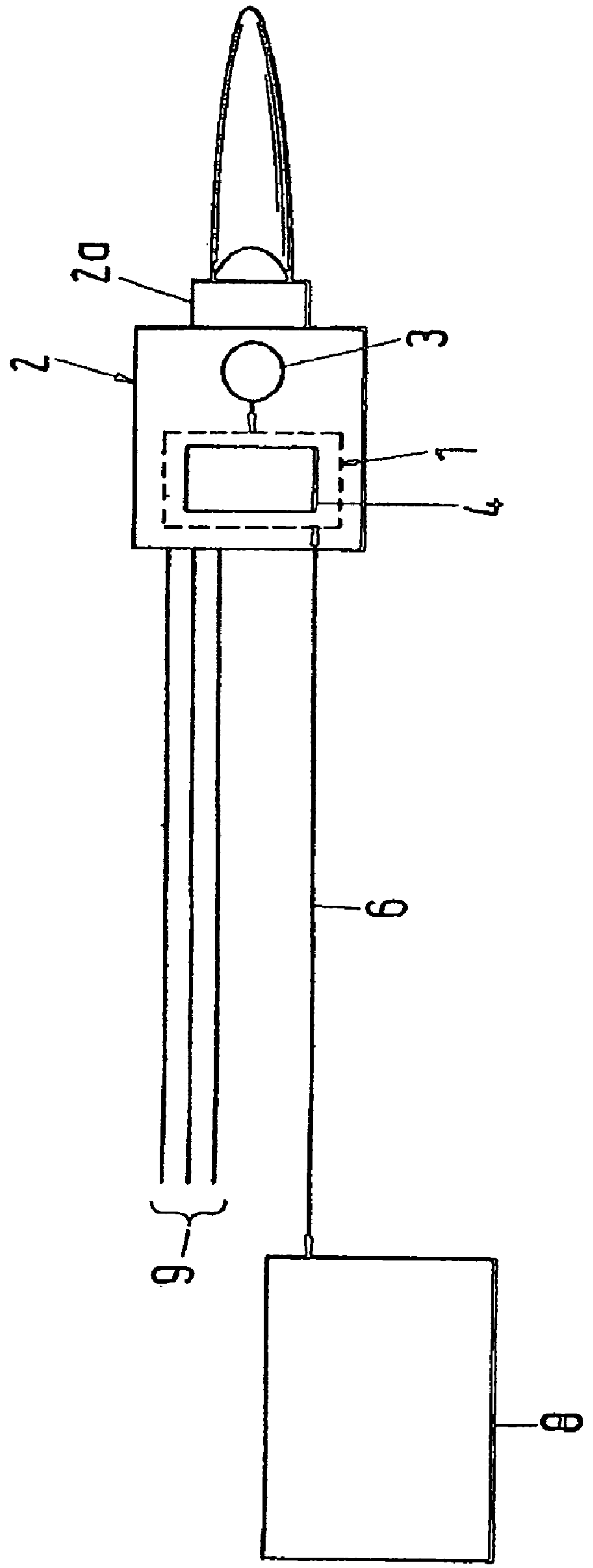
FIG. 1 shows an embodiment of a system for the data management of a thermal spraying apparatus in accordance with the present invention.

FIG. 1 shows an embodiment of a system for the data management of a thermal spraying apparatus in accordance with the present invention and in particular for the data management of a spray gun 2 of a thermal spraying apparatus. The system includes a decentrally arranged device 1 with a memory 4, in order to store data of the thermal spraying apparatus or of the spray gun, wherein the data contains identification data and operating data of the thermal spraying apparatus or of the spray gun, and wherein the device 1 additionally includes a bus interface 9 for the transmitting of the data. As shown in FIG. 1, the system can additionally include an evaluation unit 8, which is connected to the device 1 via the bus interface 6. As shown in FIG. 1, the spray gun can contain a torch 2*a*, for example a torch for plasma spraying, high velocity flame spraying (HVOF), flame spraying or arc spraying. Furthermore, as shown in FIG. 1, the spray gun 2 can be connected to supply lines 9, which serve for supplying the process. Depending on the spraying method used, supply lines for the power supply, gas supply and/or for the supply of spray powder and/or wires can be provided.

As shown in FIG. 1, the device 1 can be arranged in the spray gun 2 and, if necessary, connected to one or more measuring sensors 3, by means of which physical parameters in the vicinity of the spray gun can be detected, for example temperatures in or at the spray gun or in the vicinity of the spray gun or an electrical voltage applied in or at the spray gun, such as for example a supply voltage of the torch or a voltage at a sensor, in particular at a flame sensor. Integrated circuits with a high strength against noise voltages and electrostatic discharges (ESD) are advantageously selected in the device 1 for temperature measurement, for analogue-to-digital conversion and for data management. If required, an additional ESD protection can be provided in the device, for example when the device is to be used together with a plasma spray gun, in which the trigger voltage of the plasma torch can amount to up to 9 kV and more.

In an advantageous design variant, the device can be supplied with power via the bus interface. In a further advantageous design variant, the bus interface optionally includes one, two, three or more than three data lines. A particularly simple bus interface can be assembled using a single data line, since here two wires or cores are sufficient for the data communication. Furthermore, the two wires can be used case-by-case for the power supply of the device 1, so that the cost and complexity of the electricity connection of the device 1 can be reduced. In a typical layout, low power circuits, for example integrated low power circuits, and a bus interface with a comparatively slow transmission rate in the region of 10 to 100 kbits are used in the device. In a further advantageous design variant, the memory is formed as a non-volatile memory, for example as an electrically erasable programmable read-only memory (EEPROM).

Figure 2:
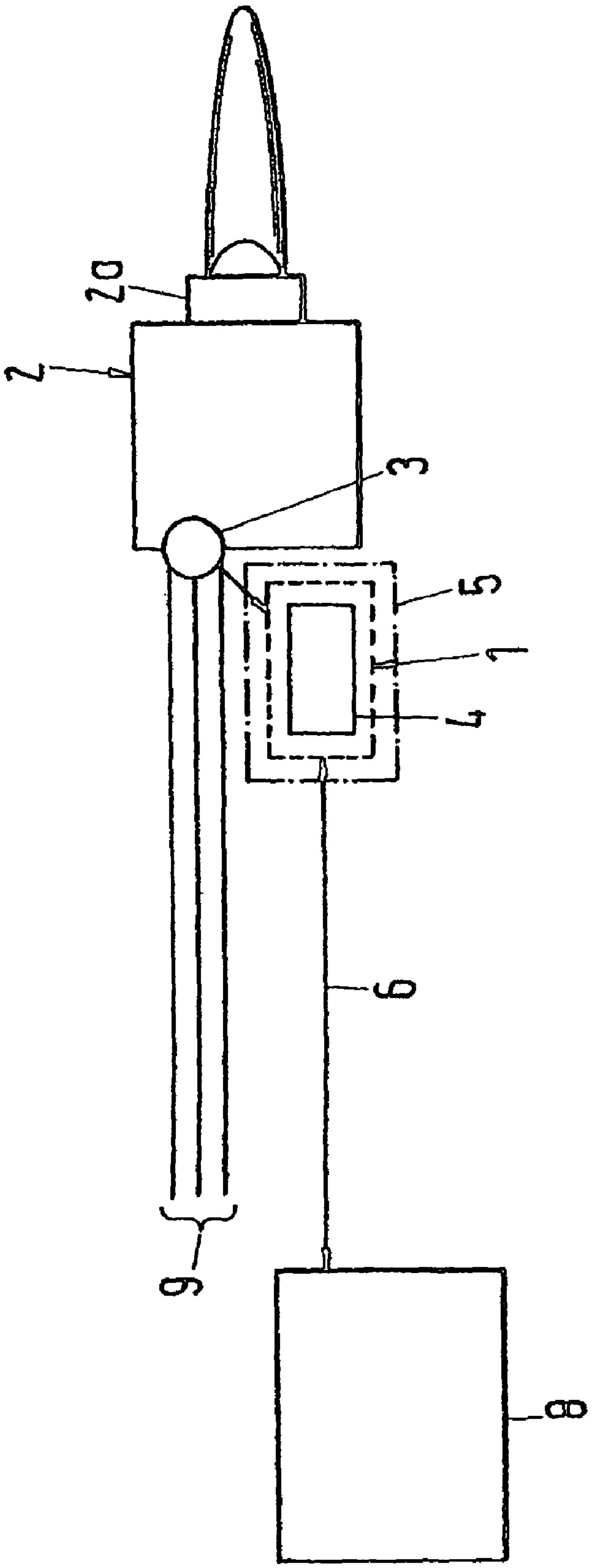
FIG. 2 shows a second embodiment of a system for the data management of a thermal spraying apparatus in accordance with the present invention.

FIG. 2 shows a second embodiment of a system for the data management of a thermal spray apparatus in accordance with the present invention and in particular for the data management of a spray gun 2 of a thermal spraying apparatus. The system in accordance with the invention includes a decentrally arranged device 1, with the second embodiment only differing from the first embodiment shown in FIG. 1 in the arrangement of the device 1. For this reason the second embodiment will only be described in brief in the following while reference is made to the above description of the first embodiment with regard to the design variants and details. The device 1 contains a memory 4 to store data of the thermal spraying apparatus or of the spray gun, with the data containing identification data and operating data of the thermal spraying apparatus and/or of the spray gun, and wherein the device 1 additionally includes a bus interface 6 for transmitting data. The system can additionally, as shown in FIG. 2, include an evaluation unit 8, which is connected to the device 1 via the bus interface 6. Moreover, as shown in FIG. 2, the spray gun can contain a torch 2*a*.

As shown in FIG. 2, in the second embodiment, the device 1 is arranged at or near to or directly on the spray gun 2 and can if necessary be connected to one or more measuring sensors 3, by means of which physical parameters can be detected in the region of the spray gun, for example temperatures and/or electrical voltages at or in the spray gun. In an advantageous design variant, the device 1 is surrounded by a housing 5, which can be mounted in or at or directly on the spray gun 2, so that the mounted device remains permanently connected to the spray gun even during a change of the place of use of the thermal spraying apparatus, and/or of the spray gun.

Figure 3:
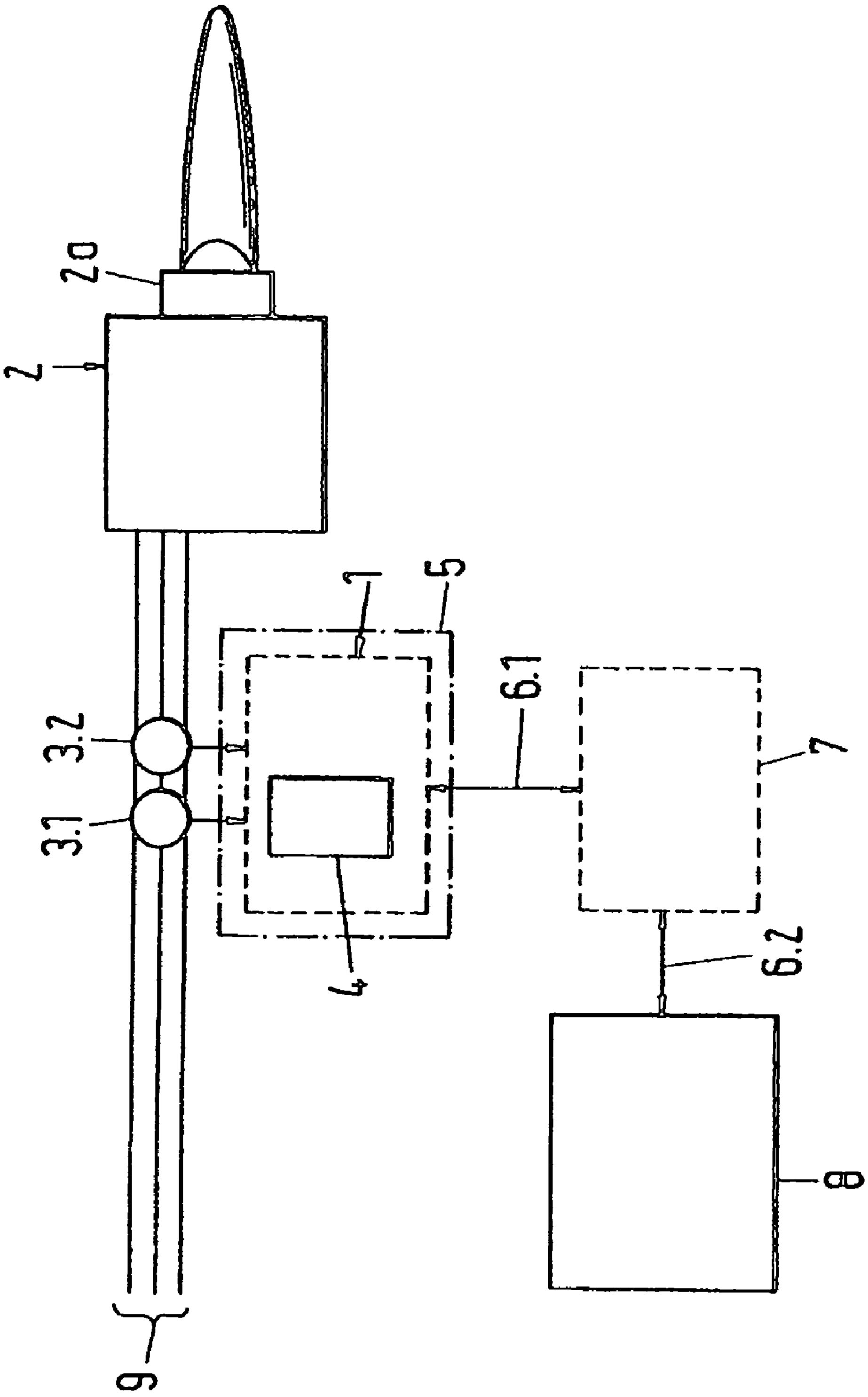
FIG. 3 shows a third embodiment of a system for the data management of a thermal spraying apparatus in accordance with the present invention.

FIG. 3 shows a third embodiment of a system for the data management of a thermal spraying apparatus in accordance with the present invention and in particular for the data management of a thermal spraying apparatus with a spray gun 2. The system in accordance with the invention includes a decentrally arranged device 1 with a memory 4, in order to store data of the thermal spraying apparatus and/or of the spray gun, wherein the data contain identification data and operating data of the thermal spraying apparatus, and/or of the spray gun, and wherein the device 1 additionally includes a bus interface 6.1, 6.2 for transmitting the data. As shown in FIG. 3, the system can additionally include an evaluation unit 8 which is connected to the device 1 via the bus interface 6.1, 6.2.

In the third embodiment, fastener elements are provided in the region of the device 1 in order to attach the device to one or more supply lines 9, which are connected to the spray gun 2, in order to secure the process supply. If necessary, the device can be connected to one or more measuring sensors 3.1, 3.2, by means of which physical parameters in the region of the supply lines and of the spray gun can be detected, for example temperatures and/or electrical voltages and/or pressures. In an advantageous design variant, the device 1 is surrounded by housing 5, which can be attached by means of the attachment element to one or more of the supply lines 9, so that the device can remain permanently connected to the same even with a change of the place of use of the spray gun.

If needed, a bus converter 7 can be provided in the bus interface independent of the actual embodiment. It is thus possible, by way of example, to provide a bus with only one data line, using a simple two-wire lead for example in a first section 6.1 of the bus interface and for example a serial bus interface connection in accordance with the RS 232 specification in a second section. As a result the connection of the bus interface to the evaluation unit is made simpler, which can be implemented in a computer or personal computer for example.

Further embodiments and details with regard to the third embodiment can be taken from the descriptions of the first and second embodiments.

An embodiment of the method in accordance with the invention for the data management of a thermal spraying apparatus, in particular of a thermal spraying apparatus with a spray gun 2, is described in the following with the help of FIGS. 1 to 3. In the method, data of the thermal spraying apparatus or rather of the spray gun is made available and stored in a memory 4 of a decentrally arranged device 1, with the data containing identification data and operating data of the thermal spraying apparatus and/or of the spray gun, and wherein the data is transmitted via a bus interface 6, 6.1, 6.2 of the device 1, for example to an evaluation unit 8. In an advantageous design variant of the method, the power supply of the device takes place via the bus interface. The data stored in the device 1 can, for example, include one or more of the following data: a serial number, an appliance identification, which can be adjusted if necessary, information on the thermal spraying apparatus and/or the spray gun, measurement values of physical parameters in the region of the supply lines 9 and of the spray gun 2 such as electrical voltages in the spray gun for example, temperatures in the device 1 and/or in the region of the spray gun and of the supply lines, pressures and through flow in the spray gun and the supply lines 9, minimum and maximum measured values, calibration information for the measurement of the physical parameters, operating state information such as the state of the flame in the torch, the length of operation of the spray gun and of parts of the same or service information.

In an advantageous design variant of the method, the power supply of the device 1 takes place via the bus interface 6, 6.1, 6.2. In a further advantageous design variant, physical parameters and/or operating conditions in the region of the supply lines and of the spray gun are detected by means of at least one pick-up 3, 3.1, 3.2 and fed to the device and stored there in the memory. In this connection an electrical voltage and/or a temperature and/or a pressure and/or a through flow and/or the presence of a flame at or in the spray gun can, for example, be detected.

The invention further includes a thermal spraying apparatus with a spray gun and a system in accordance with one or more of the above-described design variants, wherein the spray gun contains a torch, for example a plasma torch, or an HVOF torch or a flame-spraying torch or an arc spraying torch.

The system and the method in accordance with the above description make the quality assurance easier due to the data management in or at the spray gun and make possible a better monitoring of the spraying process in comparison with the prior art.

The invention claimed is:

1. A system for the data management of a thermal spraying apparatus with a spray gun, wherein the system includes at least one device which is decentrally arranged in or at the spray gun, and which has a memory to store data of the thermal spraying apparatus, wherein the stored data contain identification data and operating data of the thermal spraying apparatus including identification data and operating data of the spray gun, and wherein the device additionally includes a bus interface for the transmitting of the stored data.

2. A system in accordance with claim 1 wherein the device can be supplied with power via the bus interface.

3. A system in accordance with claim 2 wherein the bus interface includes one or more data lines.

4. A system in accordance with claim 1 wherein the memory is formed as a non-volatile memory.

5. A system in accordance with claim 1 additionally including at least one pick-up sensor connected to the device for the detection of process parameters and/or operating conditions at the thermal spraying apparatus or at the spray gun.

6. A system in accordance with claim 1 wherein the device is surrounded by a housing, which can be mounted in or at or directly on the thermal spraying apparatus or the spray gun, so that the mounted device remains permanently connected to the thermal spraying apparatus and/or to the spray gun even during a change of the place of use.

7. A method for the data management of a thermal spraying apparatus with a spray gun, comprising:

making data of the thermal spraying apparatus available and storing the data in a memory of a device, said device being decentrally arranged in or at the spray gun, wherein the data comprises identification and operating data of the thermal spraying apparatus comprising identification data and operating data of the spray gun, and transmitting the stored data over a bus interface of the device.

8. A method in accordance with claim 7, further comprising supplying power to the device via the bus interface.

9. A method in accordance with claim 8, further comprising:

detecting process parameters and/or operating conditions by means of at least one pick-up at the thermal spraying apparatus or at the spray gun;

conveying the parameters and/or conditions to the device; and storing the parameters and/or conditions in the memory.

10. A thermal spraying apparatus including a system in accordance with claim 1, and a spray gun with a plasma torch or a HVOF torch or a flame spraying torch or an arc spraying torch.

11. A system according to claim 5 wherein the at least one pick-up sensor includes a measuring sensor for an electrical voltage and/or a temperature and/or a pressure and/or a through flow and/or the presence of a flame.

12. A method according to claim 9 wherein the process parameters and/or the operating conditions comprise an electrical voltage and/or a temperature and/or a pressure and/or a through flow and/or the presence of a flame at the apparatus.

* * * * *